United States Patent [19]

MacArthur et al.

[11] Patent Number: 5,125,793
[45] Date of Patent: Jun. 30, 1992

[54] TURBINE BLADE COOLING WITH ENDOTHERMIC FUEL

[75] Inventors: Charles D. MacArthur, Clayton; Richard E. Quigley, Jr., Kettering, both of Ohio

[73] Assignee: The United States of America as Represented by the Secretary of the Air Force, Washington, D.C.

[21] Appl. No.: 726,486

[22] Filed: Jul. 8, 1991

[51] Int. Cl.⁵ .................................. F04D 29/58
[52] U.S. Cl. ................................ 415/114; 415/116; 416/96 R
[58] Field of Search .................. 416/96 R, 96 A; 415/114, 115, 116; 60/736

[56] References Cited

U.S. PATENT DOCUMENTS

| | | | |
|---|---|---|---|
| 2,849,210 | 8/1958 | Turunen et al. | 416/96 |
| 3,051,439 | 8/1962 | Hilton | 916/97 R |
| 3,734,639 | 5/1973 | Short | 415/114 |
| 4,134,709 | 1/1979 | Eskesen | 416/1 |
| 4,156,582 | 5/1979 | Anderson | 416/96 R |
| 4,259,037 | 3/1981 | Anderson | 416/96 R |
| 4,338,780 | 7/1982 | Sakamoto et al. | 60/39.05 |
| 4,522,894 | 6/1985 | Hwang et al. | 429/17 |
| 4,845,941 | 7/1989 | Paul | 60/39.06 |
| 5,003,766 | 4/1991 | Paul | 415/114 |

Primary Examiner—Edward K. Look
Assistant Examiner—Michael S. Lee
Attorney, Agent, or Firm—Bobby D. Scearce; Donald J. Singer

[57] ABSTRACT

Structure and method for cooling hollow turbine rotor blades of a gas turbine engine utilizing vaporization and decomposition of an endothermic fuel are described which comprise a source of liquid endothermic fuel operatively connected to the blade, a passage for conducting the fuel through the blade and a layer of catalyst on the internal surfaces of the blade for promoting decomposition of the fuel.

10 Claims, 1 Drawing Sheet

TURBINE BLADE COOLING WITH ENDOTHERMIC FUEL

RIGHTS OF THE GOVERNMENT

The invention described herein may be manufactured and used by or for the Government of the United States for all governmental purposes without the payment of any royalty.

BACKGROUND OF THE INVENTION

The present invention relates generally to cooled rotor blade structures for gas turbine engines and more particularly to improved cooling for a turbine rotor blade utilizing vaporization and decomposition of an endothermic fuel.

In the operation of a gas turbine engine, the flow of gaseous reaction products from the combustion chamber of the engine is used to drive the turbine by passing the gaseous products against a plurality of turbine blades mounted on the turbine rotor. Temperature of the gaseous combustion reaction products contacting the turbine blades may be in excess of 2500° F., and engine performance may be optimized in many applications by allowing a high operating temperature for the turbine inlet. In order to withstand these temperatures, hollow turbine blades have been used and cooled by flowing a coolant fluid, usually air, through the blades. To this end, existing turbine blade configurations have included hollow castings having internal air conducting chambers or passageways having suitable inlets and outlets through which coolant air may be passed.

The amount of cooling which may be provided to a turbine blade by air flow is, however, limited by the allowable air mass flow rate which can be diverted from the engine compressor, the heat capacity of the air, and the heat transfer coefficient at the interface of the air and the blade internal surfaces.

The invention solves or substantially reduces in critical importance problems with prior art turbine blade cooling methods and structures by providing cooling by vaporization and decomposition of an endothermic fuel. An endothermic fuel is a liquid fuel which decomposes in the presence of a catalyst into two or more gaseous compounds different chemically from the liquid, at least one of the gaseous compounds being combustible. An endothermic fuel is conducted to the interior of a hollow turbine blade and sprayed onto the interior wall surfaces of the hollow blade. The interior surfaces of the blade are coated with a catalyst. The fuel vaporizes and decomposes upon contacting the catalyst and thereby absorbs heat from the turbine blade wall. Fuel decomposition products flow along the blade wall toward the blade tip under the influence of centrifugal force, exit the blade through openings provided therefor and are collected for subsequent burning in the engine.

OBJECTS OF THE INVENTION

It is therefore a principal object of the invention to provide substantially improved cooling for turbine rotor blades in a gas turbine engine.

It is another object of the invention to provide improved cooling to a turbine rotor blade utilizing vaporization and decomposition of an endothermic fuel.

These and other objects of the invention will become apparent as a detailed description of representative embodiments proceeds.

SUMMARY OF THE INVENTION

In accordance with the foregoing principles and objects of the invention, structure and method for cooling hollow turbine rotor blades of a gas turbine engine utilizing vaporization and decomposition of an endothermic fuel are described which comprise a source of liquid endothermic fuel operatively connected to the blade, means for conducting the fuel through the blade, and a layer of catalyst on the internal surfaces of the blade for promoting decomposition of the fuel.

BRIEF DESCRIPTION OF THE DRAWINGS

The invention will be more clearly understood from the following detailed description of representative embodiments thereof read in conjunction with the accompanying drawings wherein.

DETAILED DESCRIPTION

Figure 1:
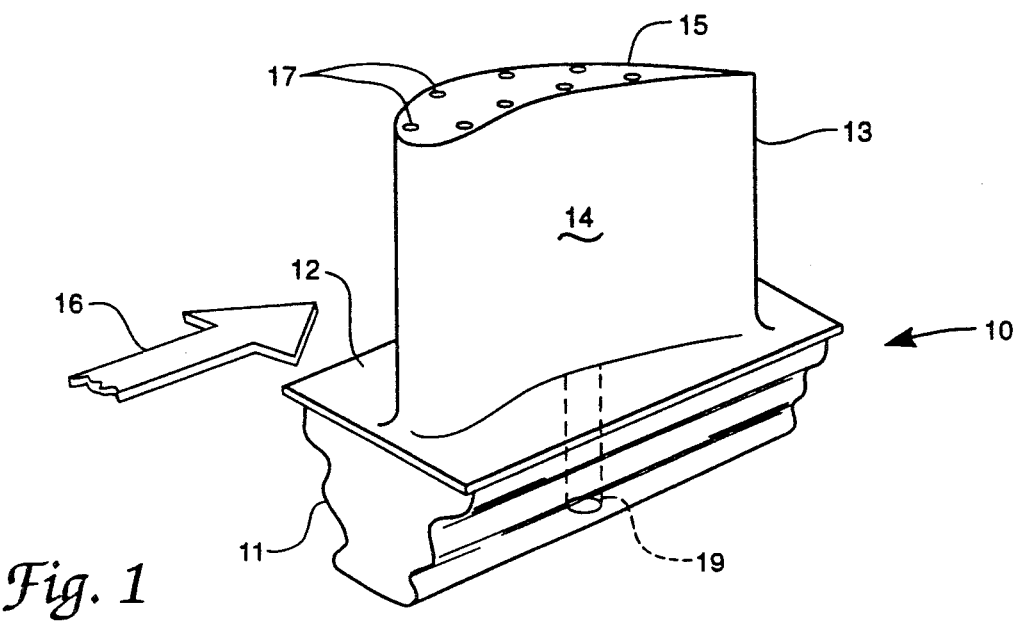
FIG. 1 is a perspective view of a typical turbine rotor blade of a type suitable for incorporation of the invention herein.

Referring now to the drawings, FIG. 1 shows a perspective view of a typical hollow turbine rotor blade 10 of a type suitable for incorporation of the invention herein. Blade 10 may comprise a casting or assembly including dovetail 11 having tangs, fir tree or other keyed configuration for mounting to a matching slot on the periphery of the rotor (not shown) of the turbine. Platform 12 supports hollow cambered airfoil blade portion 13 presenting pressure surface 14 and suction surface 15 in the flow 16 of gaseous combustion products shown schematically by the arrow. Blade portion 13 may conventionally comprise a thin-walled shell having cambered sides 14,15 defining an interior chamber and may include suitably placed openings 17 near the tip end thereof for the passage of coolant fluid, such as air, through the blade from an inlet 19.

Figure 2:
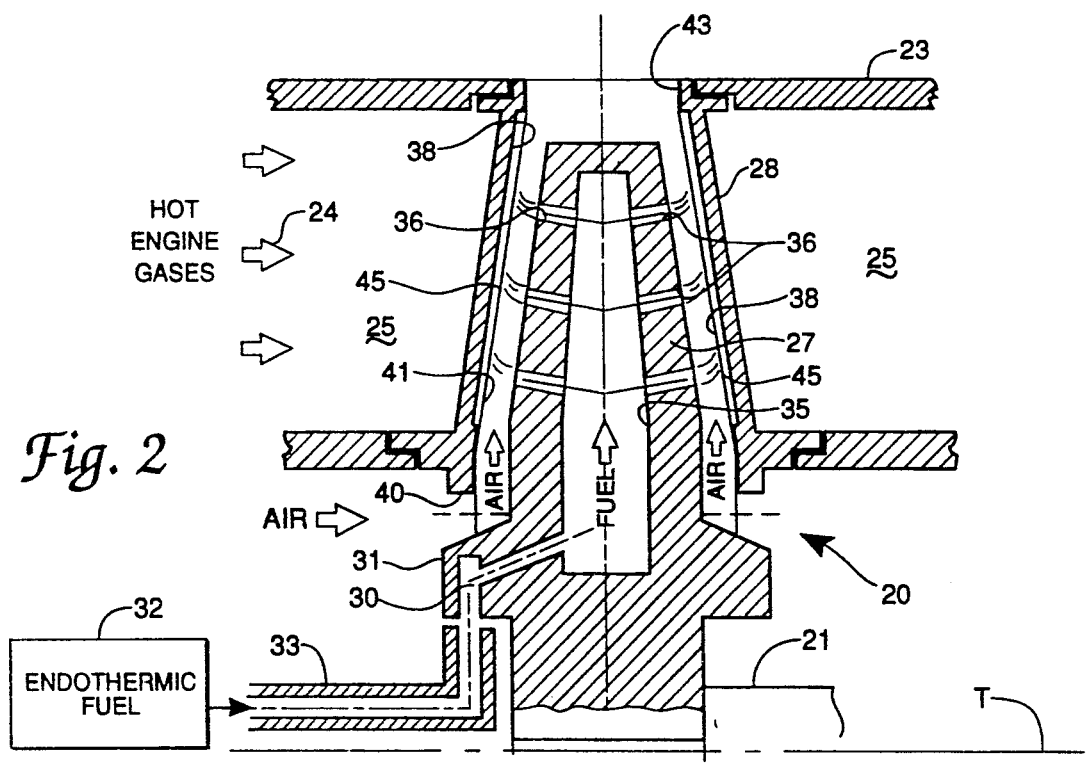
FIG. 2 is a view in axial section of a rotor blade improved according to the teachings of the invention.

Referring now to FIG. 2, shown therein is a view in axial section of a hollow rotor blade 20 structure improved according to the teachings of the invention. Blade 20 may be mounted on rotor 21 for rotation about a thrust axis T within engine housing 23, and disposed in the path of flow 24 of hot gaseous combustion products along duct 25. The structure of blade 20 includes internal structure 27 and (usually) thin walled outer shell 28 defining passageways in the interior thereof providing means for conducting coolant fluid flow through blade 20. Blade 20 may be constructed any of the well known (usually high temperature resistant) metals or alloys conventionally used in turbine blade applications, and may be fabricated by conventional methods.

In accordance with a governing principle of the invention, an inlet 30 is defined in root 31 end of blade 20 for conducting endothermic fuel into blade 20 from source 32 of the fuel. As discussed above in the BACKGROUND OF THE INVENTION, the fuel contemplated for use herein comprises a liquid fuel which decomposes in the presence of a catalyst into two or more gaseous compounds each different chemically from the liquid, at least one of the gases being combustible. The fuel may be selected by one skilled in the applicable art guided by these teachings, and may include methylcyclohexane, methanol, n-heptane or Jet Propellant (JP) 7 (a standard aviation kerosene fuel) as candidates, though specific fuel selection is not considered limiting of the invention and appended claims. Means defining suitable conduits 33 within or on rotor 21 conduct fuel from source 32 to the interior of blade 20. Internal structure 27 is configured to define passageways 35 for conducting fuel radially outwardly within blade 20 to a selected plurality of spray outlets 36 disposed in confronting relationship to the inner surface 38 of outer shell 28. A second inlet 40 may be provided for conducting air (e.g. from the compressor region of the engine) into blade 20 and along passageways 41 radially outwardly along inner surface 28 toward outlet 43.

In accordance with another principle of the invention, inner surface 38 of outer shell 28 is coated with layer 45 of catalyst suitable for promoting decomposition of the endothermic fuel. The catalyst is selected depending upon fuel selection, and may include platinum, rhenium, alumina or zeolite(s) as would occur to an artisan of ordinary skill practicing the invention.

In the operation of blade 20 according to the invention, the endothermic fuel is tranferred under pressure through conduit 33 into blade 20. Passageways 35 conduct the fuel to spray outlets 36 which spray the liquid fuel into layer 45 of catalyst. As fuel is sprayed from spray outlets 36, crossflowing air atomizes the liquid fuel into small droplets which strike layer 45 where they are vaporized and substantially simultaneously decomposed into gaseous decomposition products of the fuel. Both the vaporization and the decomposition absorb heat from wall 28. The fuel decomposition products are carried toward the tip end of blade 20 by the air flow and exit through outlet 43. In an alternate embodiment of the invention, the crossflow air and decomposition products may exit the blade trailing edge through a slot or other opening (not shown). The gaseous decomposition products are preferably directed to the engine (not shown) to be burned as fuel.

An advantage of the invention is using both the latent heat of vaporization and the heat of decomposition of the liquid endothermic fuel to cool outer wall 28 of blade 20. A combination of both of these thermodynamic quantities provide for greater heat extraction than would be available from either used separately. The cooling provided may maintain wall 28 at temperatures lower than conventional and may allow use of less temperature resistant (and less expensive) blade materials. In the alternative, conventional high temperature resistant materials may be used with attendant higher allowable turbine inlet temperatures, which in turn may provide improved engine performance.

The invention therefore provides a method for cooling a turbine blade by vaporization and decomposition of an endothermic fuel. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. Rotor blade structure for a gas turbine engine comprising:
    (a) a thin walled outer shell element having an inner surface and an outer surface;
    (b) means on said shell defining an inlet and an outlet and means defining a plurality of passageways within said shell for conducting fluid therethrough from said inlet to said outlet;
    (c) a source of liquid endothermic fuel operatively connected to said inlet; and
    (d) a layer of catalyst on said internal surface of said shell for promoting decomposition of said liquid fuel at said layer.

2. The structure of claim 1 wherein said fuel is selected n-heptane and Jet Propellant 7.

3. The structure of claim 1 wherein said catalyst is a material selected from the group consisting of platinum, rhenium, alumina and a zeolite.

4. Rotor blade structure for a gas turbine engine comprising:
    (a) a thin walled outer shell element having an inner surface and an outer surface;
    (b) means on said shell defining a first inlet and an outlet;
    (c) a source of liquid endothermic fuel operatively connected to said first inlet; and
    (d) structure internal of said shell defining a plurality of spray outlets confronting said inner surface of said shell for spraying said liquid fuel onto said inner surface and conduit means connecting said first inlet and said plurality of spray outlets for conducting said fuel to said spray outlets; and
    (e) a layer of catalyst on said internal surface of said shell for promoting decomposition of said liquid fuel at said layer.

5. The structure of claim 4 further comprising:
    (a) a source of pressurized air;
    (b) means on said shell defining a second inlet for admitting said air into said shell; and
    (c) conduit means within said shell for conducting said air past said layer of catalyst for carrying vaporized and decomposed fuel toward said outlet.

6. The structure of claim 4 wherein said fuel is selected from the group consisting of methylcyclohexane, methanol, n-heptane and Jet Propellant 7.

7. The structure of claim 4 wherein said catalyst is a material selected from the group consisting of platinum, rhenium, alumina and a zeolite.

8. In a method for cooling a turbine blade defined by a thin walled outer shell element having an inner surface and an outer surface, and including means for having means for cooling by the passage therethrough of a fluid coolant, an improvement, comprising the steps of:
    (a) providing a source of liquid endothermic fuel operatively connected to said shell element;
    (b) applying a layer of catalyst on said internal surface of said shell for promoting decomposition of said liquid fuel at said layer; and
    (c) flowing said fuel through said blade and into contact with said catalyst for cooling said blade by the vaporization and decomposition of said fuel at said layer of catalyst.

9. The improvement of claim 8 wherein said fuel is selected from the group consisting of methylcyclohexane, methanol, n-heptane and Jet Propellant 7.

10. The improvement of claim 8 wherein said catalyst is a material selected from the group consisting of platinum, rhenium, alumina and a zeolite.

* * * * *

UNITED STATES PATENT AND TRADEMARK OFFICE
CERTIFICATE OF CORRECTION

PATENT NO. : 5,125,793

DATED : June 30, 1992

INVENTOR(S) : Charles D. MacArthur et al

It is certified that error appears in the above-identified patent and that said Letters Patent is hereby corrected as shown below:

Column 1, line 57, the period should be a comma.

Column 2, line 23, --and-- should follow "herein".

Column 4, line 13 (claim 2), --from the group consisting of methylcyclohexane, methanol,-- should follow "selected".

Signed and Sealed this

Seventeenth Day of August, 1993

Attest:

BRUCE LEHMAN

*Attesting Officer*      *Commissioner of Patents and Trademarks*